May 12, 1970 — M. P. KARZENIOWSKI — 3,511,274
SELF-DRAINING AND LOCKING LIQUID VALVE
Filed Feb. 26, 1968 — 3 Sheets-Sheet 2
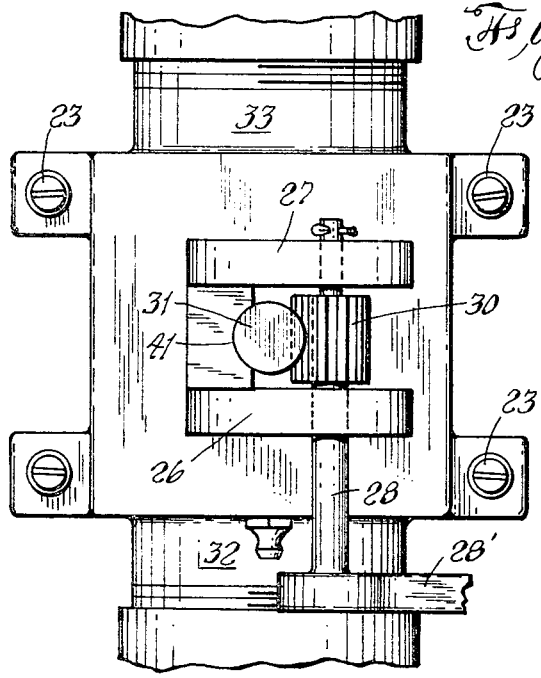
Fig. 3
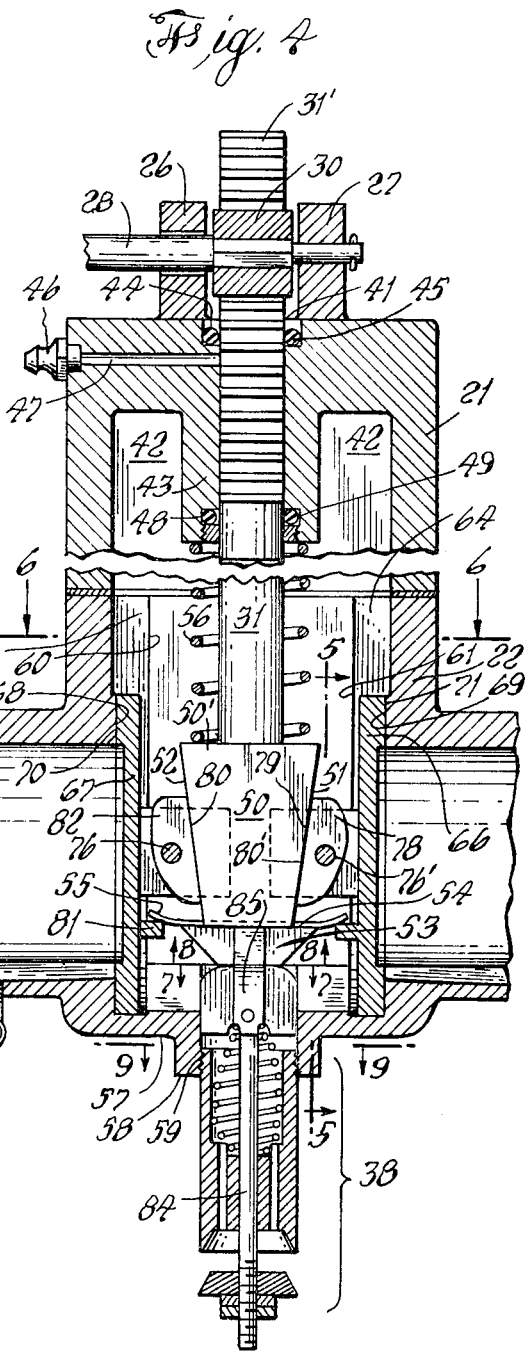
Fig. 4
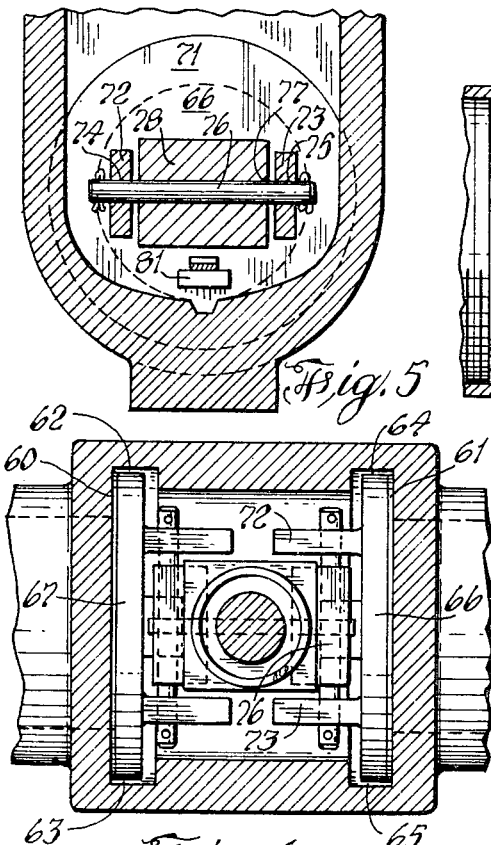
Fig. 5
Fig. 6
INVENTOR.
MICHAEL P. KARZENIOWSKI

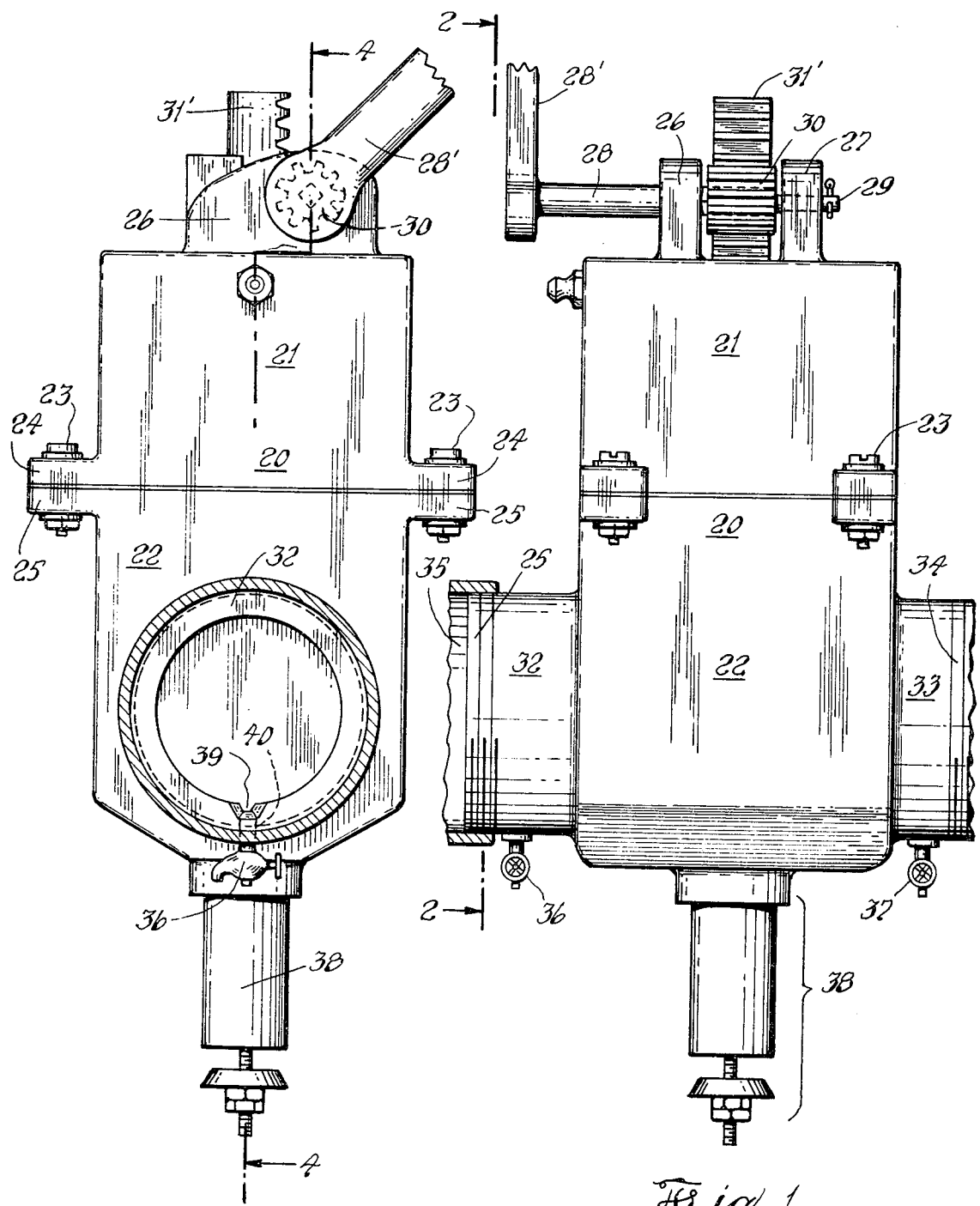

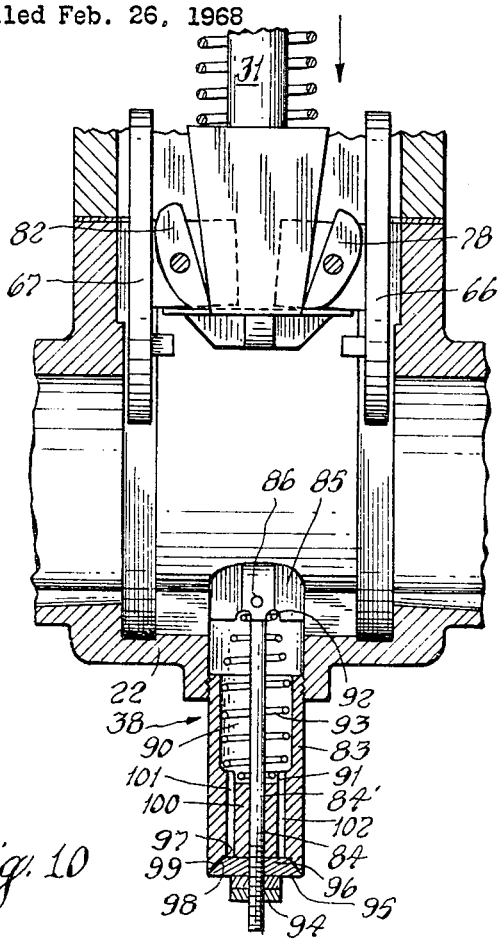
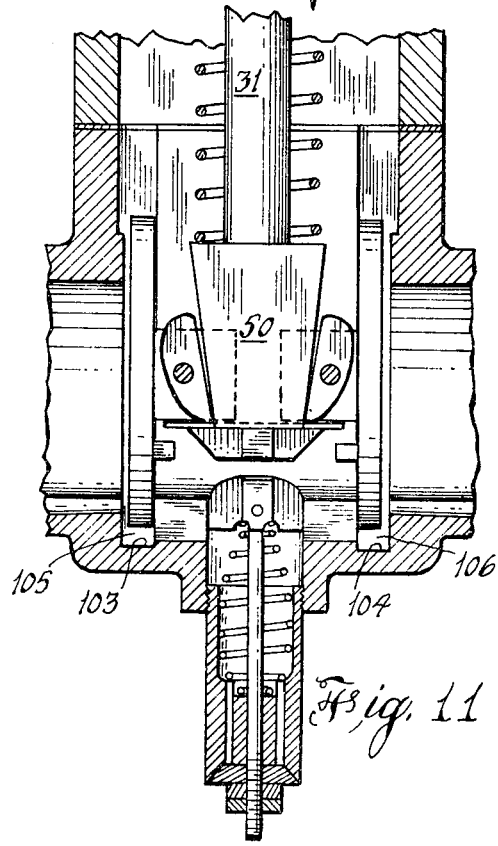
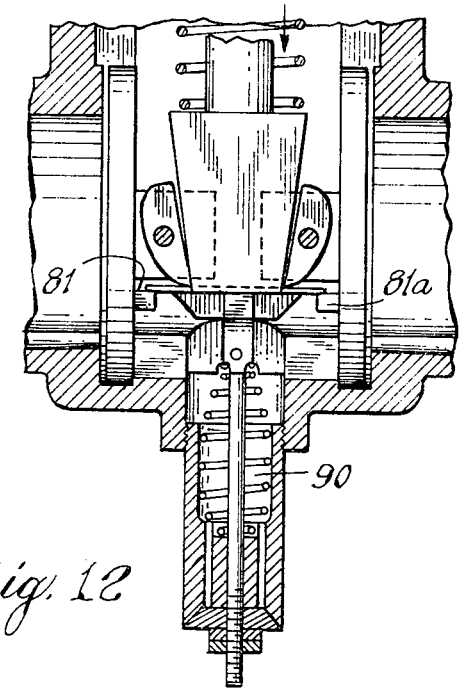
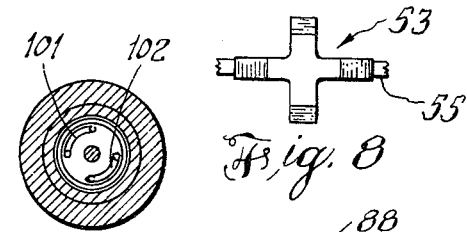
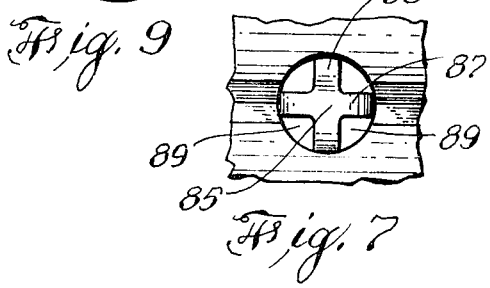

United States Patent Office 3,511,274
Patented May 12, 1970

3,511,274
SELF-DRAINING AND LOCKING LIQUID VALVE
Michael P. Karzeniowski, 75 Maple St.,
Yonkers, N.Y. 10701
Filed Feb. 26, 1968, Ser. No. 708,025
Int. Cl. F16k *11/10, 3/14*
U.S. Cl. 137—596.2          9 Claims

ABSTRACT OF THE DISCLOSURE

A liquid disc valve wherein the sealing movable discs, during operation, are directed in a perpendicular movement toward and away from the fixed element surface against which they seal. When in the closed position the lower portion of the valve body is open so as to permit drainage therefrom of any liquids accumulating therein while automatically sealing when the valve is open. The bottom surface of the valve body is contoured to direct the liquid therein to be discharged through ports provided in the drain member which is activated by the valve stem when in its lowest stage and in contact therewith.

BACKGROUND OF THE INVENTION

The present invention relates to liquid valves and more particularly to a double disc valve employing rectilinear movable discs and automatic drainage in the closed position wherein the disc sealing elements are wedged directly against the seat without contacting or abrading any surface prior thereto by a pivotal cam action.

DESCRIPTION OF PRIOR ART

In the field of liquid valves and in particular to those applications where any leakage through the valve, no matter how slow, cannot be tolerated, it has been the general practice to employ the most suitable valves available and to rely entirely on replacement thereof when leakage is detected. This is the present practice in use for motor transport vehicles which carry a supply of liquid to be mixed in transit or just prior thereto with their load. Such is the case for cement or concrete transit mix vehicles where only a specific amount of water can be added to the cement and sand and stone to provide a satisfactory mix. It is therefore clear that after the water has been added to the other constituents and the load is being mixed in transit, or on the job site, the subsequent addition of water will result in what is referred to as a "wet load." Wet loads or dumps are most prevalent on long hauls since a large percentage of valves now in use leak to some extent. This mix is totally unacceptable in view of its poor physical characteristics, in particular, strength, and must be rejected on delivery, thereby necessitating returning to the plant and disposing of the useless "wet load."

The valves used for this purpose on transit mixers do not maintain their watertight integrity over any appreciable period of time due to the fact that in closing and opening one or more of the moving sealing elements abrade one another and this action results in slow leakage. One solution to' this problem has been to interpose between the source of water or tank and the rotating drum into which the water is directed, a water supply shut off valve. This valve, however, has certain deficiencies in that instant use of the wash off hose and load mixing are not possible. In addition, it has been found that these valves also develop leaks and tend to open through constant use and vibration occasioned by road conditions as well as loading and unloading of the vehicle itself. In general this solution has not provided satisfactory results and is presently being discontinued.

Additional complications are inherent in equipment and in the valving system of transit mixers. For example, during freezing conditions, especially at night when the mixers are stored and inactive, the water which accumulates within the lower portion of the valve chamber freezes as well as that in contact with the moving elements thereof. This necessitates that the valve be heated, generally with a blow torch, before the mixer is used in the morning, since, as a general rule the valve is left open during the night to avoid freezing. In so doing two things happen; (1) the small amount of water left in the bottom of the valve freezes and when the valve is closed in the morning before loading it cannot close all the way; (2) when the hot water that is used during the winter weather melts the ice in the bottom of the valve, leaving the valve partially open, as a result a wet load before leaving the loading plant. More often than not, the valve is unintentionally left open due to the fact it is quite difficult for the driver to ascertain the operating position of the valve. This results in subsequent "wet loads" with an appreciable loss in both time and material. This invention provides a clear visible indication of the valve position as well as being automatically self draining.

The water assembly feed system of a transit mix is provided with a packing nut component which is immersed or packed with grease to reduce the wear and tear due to abrasion and friction. Where the valve leaks, even slowly, over an extended period, the pressure on the packing nut would be increased and the grease washed away, thus subjecting the packing nut assembly to excessive wear. This is prevented by the self-draining feature mentioned above. Those concerned with the development of valves for use on transit mixers have long recognized the need for a reliable automatic self-draining and self-locking valve. The present invention fills this critical need.

SUMMARY OF INVENTION

The general purpose of this invention is to provide a reliable, automatically self-draining liquid valve that has all the advantages of similarly employed prior art devices without any of the above-described disadvantages or limitations. To attain this, the present invention provides a self-locking disc valve having a unique arrangement of components wherein the sealing discs are operable in a vertical direction for alignment with their respective valve seats by a shaft or stem which is biased in one position. The discs subsequently are moved toward and away from the seats by a unique cam arrangement in a direction perpendicular thereto and are locked in their closed position by the biased shaft. In the closed position the lower portion of the valve chamber is automatically permitted to drain off any liquid accumulated therein.

An object of this invention to provide a reliable, simple, inexpensive self-locking and draining valve which employs a minimum of components and which is free of inherent frictional abrasion of the valving surfaces during opening and closure.

Another object is to provide a liquid valve which is self-draining and whose open or closed positions are readily ascertainable and which may be locked in the closed position.

BRIEF DESCRIPTION OF THE DRAWINGS

In the accompanying drawings:

FIG. 1 is a front elevation, with the operating handle partially broken away, of an embodiment of a valve made in accordance with the principles of this invention;

FIG. 2 is a side elevation of said valve taken approximately along 2—2 of FIG. 1;

FIG. 3 is an upper plan view of said valve;

FIG. 4 is a cross section view taken approximately along 3—3 of FIG. 2;

FIG. 5 is a cross-sectional view taken approximately along 5—5 of FIG. 4;

FIG. 6 is a partial cross-sectional view taken approximately along 6—6 of FIG. 4;

FIG. 7 is a partial cross-sectional view taken approximately along 7—7 of FIG. 4;

FIG. 8 is another cross-sectional view taken approximately along 8—8 of FIG. 4;

FIG. 9 is still another cross-sectional view taken approximately along 9—9 of FIG. 4;

FIG. 10 is a cross-sectional view of the embodiment with the discs and shaft fully retracted into the open position;

FIG. 11 is a cross-sectional view showing the discs and shaft in its travel intermediate the open and closed positions; and, FIG. 12 is a cross-sectional view showing the discs and shaft immediately prior to the fully closed position.

DESCRIPTION OF THE PREFERRED EMBODIMENT

In the illustrated embodiment of the invention as shown in FIG. 1, the valve 20 comprises an upper chamber 21 and a lower chamber 22 which are affixed to one another by bolts 23 passing through aligned extending flanges 24 and 25 defining therebetween a plenum chamber. A gasket (not shown) may be interposed between the periphery of chambers where high pressure liquids are to be encountered. The upper chamber 21 carries on its outer surface a pair of upstanding spaced apart support legs 26 and 27 with horizontal aligned apertures through which passes the shaft 28 of the operating handle 28' and which is supported for rotation therein. The opposite end of shaft 28 is provided with a retaining means such as cotter pin 29. Disposed intermediate the support legs 26 and 27 and affixed to the shaft 28 for rotation therewith is a circular drive gear or pinion 30. This drive gear pinion engages the ratchet portion 31' of the valve operating shaft or stem 31 which extends centrally through and into the entire valve chamber.

The lower chamber 22 is provided with a pair of oppositely and outwardly directed pipe nipples 32 and 33 over the valve ports and serve to couple the valve between the source of liquid and for example, the drum of a transit mixer. These are provided with coupling threads 34 at the end for attachment to a hose 35. Additionally, the extending pipes are each provided with drain petcocks 36 and 37. The bottom of the lower chamber carries an automatic valve drainage assembly 38. The chamber housing can be fabricated of any suitable metal or alloy such as brass which is quite common and well known in the art.

FIG. 2 more clearly illustrates the relationship of the petcock to the pipe into which it is disposed. The pipe 32 has its lower inner wall recessed as at 39 which, longitudinal recess, increases in depth from that part of the pipe proximate the valve chamber or port to the opening 40 into which the petcock is threaded. Thus any liquid within this pipe will normally drain therefrom when the petcock is opened.

FIG. 3 illustrates the spacial relationship of the shaft driving elements such that the shaft 31 passes through an opening 41 in the upper chamber while its ratchet portion is engaged with the pinion 30 that is rotated via the operating handle 28' so as to allow the shaft to reciprocate into and out of the valve under the movement of the handle 28'.

FIG. 4 shows in cross-section the internal arrangements of the valve components when the valve is in the closed position. The shaft or stem 31 passes into the opening 41 in the upper chamber which is formed with an internal annular plenum 42 leaving a central support column 43 through which the shaft moves. The upper chamber is recessed to provide an annular opening 44 about the shaft within which is seated an upper O-ring 45. The stem is lubricated via a grease fitting 46 which communicates with the stem by way of passage 47, intermediate the upper O-ring 45 and a similarly disposed lower O-ring 48 in annular recess 49. This provides a means for lubricating the shaft when necessary and prevents the loss of lubricants either from passing out of the chamber or being washed away by the liquid in the chamber.

The lower end of the stem is formed into enlarged portion 50 having a shoulder 50' and a pair of depending opposite side cam faces 51 and 52 which are convergent toward drain activator end 53 which is also shouldered at 54. This actuator end 53 is bevelled inwardly and is cut out (see FIG. 8) so as to form a "crossarm" to permit the passage of fluid thereabout when it abuts another member. A bias member or flat spring 55 abuts the shoulder at 54 and is supported by the stem, as for example, by being fixed in an opening through the stem and having its flat faces directed up and down as as to provide flexure in this plane.

A coil spring 56 not shown in its entirety is disposed between the support column 43 and the shoulder 50' so as to continually urge the stem 31 into a downward or closed position. This spring should, preferably, be of the type identical to coil spring 93 of FIG. 10 where it is of reduced diameter, at its ends, in order to supply a maximum of force with a minimum of space when compresed. Both the shoulder 43 and the shoulder 50' may be provided with an annular recess for positive retention of the coil spring member 56.

The lower face 57 of chamber 22 carries a hollow cylindrical extension or drain port 58 whose inner wall is provided with threads as at 59 into which the outer threads of the drainage assembly mate for support of the assembly therein. The opposite inner planar walls 60 and 61 of both chambers (see FIG. 6) are formed so as to provide vertically extending channels or guides 62, 63 in one wall and 64, 65 in the opposite wall. These channels extend on opposite sides of the inlet and outlet ports over which the nipples 32 and 33 extend. A pair of circular disc members 66 and 67 are disposed within the channels and are free to move toward and away from the ports. The circular surfaces 68 and 69 about the port extend slightly into the chamber and are of a material suitable as valve seat facings, generally, metallic so that in combination with the valve faces 70 and 71 of the discs, which are of a softer material, an excellent seal can be made and readily replaced. It is evident that the valve seat faces of the discs extend beyond the disc face in order to provide a better seal as well as to compensate for wear and tear and be capable of subsequent regrinding when necessary.

FIGS. 5 and 6 more clearly illustrate the physical relationships described above. The disc 66, as well as the other disc, carries a pair of spaced apart inwardly extending arms 72 and 73 on its inner face. These arms are affixed thereto and are centrally apertured. The holes 74 and 75 are aligned and have disposed therein a cam support shaft 76 whose ends have retaining means such as the illustrated cotter pins. Supported for free rotational movement on the shaft 76 via an aperture 77 is a cam member 78. The cam member has an outwardly facing curved surface 79 and an inward angled face 80 which is angularly complementary to the cam face 51 or 52 of the lower end of the stem 31. Each disc also carries a stop member 81 which is positioned below and central of the cam member 78 and extends somewhat outwardly of the disc.

Considering first the situation illustrated by FIG. 10 where the stem has been fully retracted so that the valve is open and the inlet and outlet ports are in direct unobstructed full communication with the lower chamber and with each other. The discs 66 and 67 are supported by the lower portion of the stem since the bottom of the cams 78 and 82 rest directly on the bias spring member 55 which is affixed to the stem 31. Thus, in its upward travel the stem carries both of the discs which travel in their respective channels. In the retracted position the coil spring 56 is compressed but held in this position by the frictional inertia inherent in the upper gear arrangement. Under these conditions the drain assembly 38 is in its closed position so as to prevent any liquid from passing therethrough.

This drainage assembly 38 includes a body portion 83 whose upper outer surface is threaded so as to mate with and screw into the lower valve chamber 22. A central shaft 84 extends through and out of the lower end body 83 via a lengthwise central opening 84' therethrough. The shaft 84 is free to reciprocate within the body 83 and carries at its upper end a drain head 85 which is affixed to the shaft by any suitable means, as for example, a retaining pin 86 or it may be fabricated integral with the shaft. The head 85 extends into the lower chamber and is spaced apart from the body 83 so that it is free to move into and out of the lower chamber while carrying with it the shaft 84. The drain head 85 is contoured or cutout so as to form a pair of cross arm (see FIG. 7) 87 and 88 joined at the center to the shaft 84. The open quadrants 89 between the cross arms permit liquids to pass freely and downwardly by the drain head into the cavity area 90 in the upper end of the body 83. Disposed between the annular recess 91 in the body and a similar recess 92 in the bottom face of the drainhead is a coil spring 93. This spring 93 urges the drain head into its uppermost position so as to separate it from the body while locking means such as nuts 94 threaded to the lower end of the shaft 84 which bear against the lower flat face 95 of drain seal 96 limit the head's upward travel.

The inner lower wall 97 of the body 83 is annularly bevelled as at 98 so as to tightly abut the chambered circular side wall 99 of the drain seal 96 and thereby effectuate a liquid seal under the action of the spring 93. The central or intermediate portion 100 of the drain body is provided with longitudinal sectorial slots 101 and 102 (also see FIG. 9) which extend from the cavity area 90 to the drain seal 96. Thus, when the drainhead is urged in a downward direction against the spring and depresses the stem 84, the drain seal 96 is separated from the body portion. There now exists (see FIG. 4) a communicating liquid passage from the interior portion of the valve to the outer environment. This passageway consists of the open quadrants 89 of the drain head, the cavity 90, the slots 101 and 102.

Considering now an intermediate position such as has been illustrated in FIG. 11 wherein the valve stem 31 has freely carried the valve discs 66 and 67 so that they are in opposing facing relationship with the ports but have not travelled sufficiently downward to contact the base 103 (104) of recesses 105 (106) in the lower chamber 22. During this downward excursion, the discs have not contacted any surface since they loosely fit into their respective guide channels and are freely supported through spring 55, the cam members, and shafts 76 and 76'. FIG. 12 shows the arrangements when the discs have terminated their downward travel and abut the base 103 (104). In this position the extending wings of flat spring 55 rest against stop members 81 (81a) which are carried by the discs since the discs are precluded from any further downward motion. Simultaneously the drain actuator end 53 carried by the stem just abuts the upper face of the drain head and the angled faces 80 (80') of the discs almost fully abut the stem cam faces 51 and 52 while still in sliding contact.

Further depression of the stem 31 results in a number of simultaneous coactions which are delinated in FIG. 4. The wings of spring 55 are now deflected due to their contact with the disc stop members 81 and 81a thus permitting the actuator end 53 to depress the drain head 85 and the shaft 84, and thereby open the drain seal 96 against the bias force of spring 93. Further travel of the stem 31 is prevented by the restaining action of the spring 55. The camming action of faces 80 (80') of the discs against the stem cam faces 51 (52) as it travels downwardly transmits an outwardly perpendicular force to the cam support shafts 76 (76') which are central of the discs. Thus a force is exerted at the center of each disc to impart thereto a perpendicular movement to force the discs into sealing arrangements with their respective valve seats 70 and (71). It should be noted that the angles of the abutting surfaces of the cam and stem 80 (52) and 81' (51) are selected so that each of the discs have just come into abutting relation with the valve seats at the moment when the spring 55 is to commence its deflection. This allows each disc to move freely outwardly (toward its seat) without frictionally contacting any other surface, in particular, the walls of the channel in which they ride. Therefore, in the closed position the valve discs form a tight seal across both valve chamber openings and the drain assembly is open, allowing the drainage of any liquid remaining in the lower chamber. Although both coil spring 93 and flat spring 55 exert forces in such a direction as to urge the opening of the valve, larger coil spring 56 and the gearing arrangement for activating the stem 31 maintain the valve in its closed state to provide a self-locking and automatically draining valve.

It should be noted that the cam elements 78 and 82 carried by the discs are pivotally and centrally supported. This permits the cam members to assume a variety of positions relative to the stem portion 50 and its camming surfaces so that the camming action will only occur and commence at a particular position, will effectively be self-compensating, and will insure a perpendicular force application to the discs without possible abrasion.

What I claim is:
1. A valve comprising:
 a valve casing body having,
  a plenum chamber,
  lower opposed inlet and outlet ports each having thereabout a valve seat,
  a drain port in the lowermost portion of said body,
  a stem reciprocable in said valve and having a handle extending outwardly and an opposite operating end thereof having an opposing pair of wedge-like camming surfaces,
  a transversely extending yielding member carried by said stem below said operating end,
  a pair of vertical guide means extending across and beyond said inlet and outlet ports for loosely confining therein,
 a valve disc for free vertical movement and limited transverse movement in each of said guide means and each carrying,
  a pivotal supported camming means directed inwardly for coacting with said stem camming surfaces,
  a stop member disposed below said camming means for coacting with said yielding member,
 a drain assembly means disposed in said drain port having
  a head portion extending into said plenum,
  yieldable closure means closing said drain assembly means and urging said head into said plenum and opening said closure means when said head is depressed outwardly of said plenum by said stem,
 means for selectively reciprocating said stem,
 bias means urging said stem downwardly into the valve, closed position whereby when said stem is in its uppermost position said discs are retracted, said valve ports are open and said drain closed, when said stem travels downwardly into said valve carrying therewith said discs supporting them by said yielding member and upon said discs terminating their downward travel and are opposite their respective ports said yielding member will contact said stop member, said camming surfaces abut whereby further movement by said stem will urge said discs outwardly into sealing contact with their respective seats and depress said drain head, opening said assembly.

2. The valve according to claim 1 wherein said guide means are vertical channels formed on the inner walls of said casing body.

3. The valve according to claim 2 wherein said pivotal camming means comprises:
 a pair of spaced arms affixed to and extending out from the inner face of each of said discs,
 a shaft supported therebetween,
 a cam member axially supported on said shaft for free rotation thereabout and having a camming surface directed toward said stem.

4. The valve according to claim 3 wherein said means for selectively reciprocating includes a pinion and rachet arrangement affixed to said stem handle have sufficient frictional inertial to maintain said stem in the valve open position.

5. The valve according to claim 4 wherein said bias means is a coil spring disposed about said stem and having one end abutting said operating end of said stem and the other end thereof abutting the upper inner wall of said body.

6. The valve according to claim 5 wherein said drain assembly means includes
 a body portion having a central passageway therethrough and openings extending lengthwise thereof for permitting liquid to pass through,
 a drain stem slidably disposed in said passageway and carrying at one end thereof said head portion and at the other end thereof means for closing said openings against the passage of liquid.

7. The valve according to claim 6 wherein said yieldable closure means includes another coil spring disposed about said drain stem.

8. The valve according to claim 7 further including
 a travel limit member carried by said drain stem for selectively limiting the upward travel of said stem, and
 said head portion is formed with crossed recesses in the upper surface thereof.

9. The valve according to claim 8 further including:
 a pipe nipple connected across each of said ports and having in the lower wall thereof a petcock extending therethrough,
 said lower wall of said nipple being formed on its inner surface to converge toward said petcock.

References Cited

UNITED STATES PATENTS

| | | | |
|---|---|---|---|
| 680,714 | 8/1901 | Jefferson | 251—167 |
| 750,128 | 1/1904 | Schneider | 251—199 |
| 1,360,340 | 11/1920 | Wetzler | 251—199 XR |
| 1,506,259 | 8/1924 | Sherman | 137—305 |
| 1,928,071 | 9/1933 | Mueller | 137—596.2 |

HENRY T. KLINKSIEK, Primary Examiner

U.S. Cl. X.R.

251—199